US006926963B2

(12) United States Patent
Ohmori et al.

(10) Patent No.: US 6,926,963 B2
(45) **Date of Patent: *Aug. 9, 2005**

(54) HIGHLY WEATHER-RESISTANT MAGNET POWDER AND MAGNET PRODUCED BY USING THE SAME

(75) Inventors: Kenji Ohmori, Ichikawa (JP); Toshiyuki Osako, Ichikawa (JP); Kayo Hashiguchi, Ichikawa (JP); Kouichi Yokosawa, Ichikawa (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 180 days.

This patent is subject to a terminal disclaimer.

(21) Appl. No.: 09/963,674

(22) Filed: Sep. 27, 2001

(65) Prior Publication Data

US 2002/0084440 A1 Jul. 4, 2002

(30) Foreign Application Priority Data

Nov. 13, 2000 (JP) ....................................... 2000-344981
Apr. 17, 2001 (JP) ....................................... 2001-118032
Jul. 25, 2001 (JP) ....................................... 2001-224299

(51) Int. Cl.[7] ................................................ B32B 15/02
(52) U.S. Cl. .................... 428/403; 252/62.54; 428/336; 428/570; 428/704; 428/900
(58) Field of Search ........................ 252/62.54; 428/336, 428/402, 403, 570, 704, 900, 550

(56) References Cited

U.S. PATENT DOCUMENTS 4,668,283 A 5/1987 Honda et al. ............... 209/216
5,393,445 A * 2/1995 Furuya et al. ........... 252/62.54
5,453,137 A * 9/1995 Takahashi ................... 148/306
6,638,367 B2 * 10/2003 Ohmori et al. ............. 148/105

FOREIGN PATENT DOCUMENTS

| | | | |
|---|---|---|---|
| EP | 0 260 870 A2 | | 3/1988 |
| EP | 0430198 A2 | * | 6/1991 |
| JP | 06-077027 | | 3/1994 |
| JP | 11-251124 | | 9/1999 |
| JP | 11-251131 | * | 9/1999 |
| JP | 2000-058312 | * | 2/2000 |
| JP | 2000-208321 | | 7/2000 |
| JP | 2000-294415 | | 10/2000 |

OTHER PUBLICATIONS

Arlot et al.; "Particle size dependence of the magnetic properties of zinc–coated $Sm_2 (Fe_{0.9}Co_{0.1})_{17} N_{2.9}$ powders"; Journal of Magnetism and Magnetic Materials; vol., 172, pp. 119–127; (1997).

* cited by examiner

*Primary Examiner*—D. S. Nakarani
(74) *Attorney, Agent, or Firm*—Armstrong, Kratz, Quintos, Hanson & Brooks, LLP

(57) ABSTRACT

The objects of the present invention are to provide a highly weather-resistant iron-based magnet powder containing a rare-earth element, characterized by high coercive force in a practically important humid atmosphere, resin composition containing the same powder for bonded magnets, and bonded and compacted magnets containing the same powder. The present invention provides the above-described products by optimizing the functions and types of the phosphate coating film, uniformly formed over the surfaces of the iron-based magnet powder particles containing a rare-earth element.

12 Claims, No Drawings

HIGHLY WEATHER-RESISTANT MAGNET POWDER AND MAGNET PRODUCED BY USING THE SAME

TECHNICAL FIELD

This invention relates to a highly weather-resistant magnet powder and the magnet produced by using the same, more particularly an iron-based magnet powder containing a rare-earth element, characterized by high resistance to weather and controlled deterioration of coercive force in a humid atmosphere, resin composition containing the same powder for bonded magnets, and bonded magnet and compacted magnet produced by using the same powder.

BACKGROUND OF THE INVENTION

The ferrite, Alnico and rare-earth magnets have been used for various purposes, e.g., motors. However, these magnets are mainly produced by the sintering method, and have various disadvantages. For example, they are generally fragile and difficult to be formed into thin or complex-shape products. In addition, they are low in dimensional precision, because of significant shrinkage of 15 to 20% during the sintering step, and need post-treatment, e.g., grinding, to improve their precision.

On the other hand, bonded magnets have been recently developed, in order to solve these disadvantages and, at the same time, to develop new applications. Bonded magnets are generally produced by filling them with a magnet powder using a thermoplastic resin, e.g., polyamide or polyphenylene sulfide resin, as the binder.

Of these bonded magnets, those comprising iron-based magnet powder, especially the one containing a rare-earth element, tend to be rusted and lose the magnetic characteristics in a high temperature, humid atmosphere. To overcome these problems, the surface of the compact is coated with a film of, e.g., thermosetting resin, phosphate (as disclosed by Japanese Patent Laid-Open No.208321/2000), to prevent rusting. Nevertheless, however, they are still insufficient in rust-preventive effects and magnetic properties, e.g., coercive force.

It is necessary, when an iron-based magnet powder containing a rare-earth element is kneaded together with a resin for a bonded magnet, to crush the magnet alloy powder to several microns, in order to secure sufficient magnetic characteristics. The magnet alloy powder is normally crushed in an inert gas or solvent. However, finely crushing a magnet powder causes a problem. The finely crushed powder is so active that, when coming into contact with air before being coated, it will be rapidly rusted by oxidation to lose its magnetic characteristics.

Several attempts have been made to solve the above type of problems. For example, a magnet alloy powder is slowly oxidized, after it is crushed to several microns, with a very small quantity of oxygen introduced into the inert atmosphere. Another measure is coating the crushed magnet powder with a phosphate, as disclosed by Japanese Patent Laid-Open No.251124/1999.

However, the crushed magnetic particles agglomerate with each other by the magnetic force. Such a powder, although improved in resistance to weather in a dry atmosphere, is not satisfactorily improved in the practically important resistance in a humid atmosphere, even when the agglomerated particles are protected with the coating film, conceivably because of insufficient protection of the individual particles. Therefore, coating the powder still fails to solve the problem.

Under these circumstances, small-size motors, acoustic devices, office automation devices or the like have been recently required to be still smaller, which requires the bonded magnets therefor to have still improved magnetic characteristics. However, the magnetic characteristics of the bonded magnet of the conventional iron-based magnet powder containing a rare-earth element are insufficient for the above purposes. Therefore, it is strongly desired to improve magnetic characteristics of bonded magnets in the early stage by improving resistance of the iron-based magnet powder containing a rare-earth element to weather.

Another important problem to be solved is to increase energy product of the magnet itself. Energy product of a bonded magnet, which contains a resin, is naturally limited to a certain level. For a magnet to have an energy product higher than that of a bonded magnet, it is necessary to increase its apparent density to a level close to the intrinsic density of the magnet powder. One of the common methods therefor is sintering, described above. Another method is hot compression molding to compact the magnet powder. For example, a Nd—Fe—B-based magnet powder produced by the rapid quenching method can be formed into an isotropically compacted magnet having an energy product of 14MGOe at the highest, when hot-pressed. An Sm—Fe—N-based magnet powder is decomposed, when heated at 600° C. or higher, and several methods have been investigated to solve this problem, including hot isostatic pressing (HIP) (Powder and Powder Metallurgy, No. 47, 2000, pp. 801), impact compression (Japanese Patent Laid-Open No.77027/1994) and conductive powder rolling (Japanese Patent Laid-Open No.294415/2000). Nevertheless, however, none of these methods still give a compacted magnet of sufficient resistance to weather. The compacted magnet is also demanded to have improved weather resistance, as is the case with the above-described bonded magnet.

It is an object of the present invention to provide an iron-based magnet powder containing a rare-earth element, characterized by high resistance to weather and controlled deterioration of coercive force in a humid atmosphere, to solve the problems involved in the conventional techniques. It is another object to provide a resin composition containing the same powder for bonded magnets. It is still another object to provide the bonded magnet and compacted magnet produced by using the same powder.

SUMMARY OF THE INVENTION

The inventors of the present invention have found, after having extensively studied to achieve the above objects, that the desired magnet powder having high resistance to weather can be obtained by optimizing the functions and types of the phosphate coating film uniformly formed over the iron-based magnet powder particles containing a rare-earth element, and that the desired bonded or compacted magnet of high resistance to weather can be obtained by using the above magnet powder, reaching the present invention.

The first aspect of the invention provides a highly weather-resistant iron-based magnet powder containing a rare-earth element, wherein the particles of the magnet powder are uniformly coated with a phosphate film to a thickness of 5 to 100 nm on the average.

The second aspect of the invention provides the highly weather-resistant magnet powder of the first invention, wherein the magnet powder is an alloy powder selected from the group consisting of Nd—Fe—B-based and Sm—Fe—N-based powder.

The third aspect of the invention provides the highly weather-resistant magnet powder of the second invention, wherein the particles of the Sm—Fe—N-based alloy powder, when used, are uniformly coated beforehand with a zinc film.

The fourth aspect of the invention provides the highly weather-resistant magnet powder of the first invention, wherein the phosphate coating film is a composite composed of iron phosphate and another phosphate and contains iron phosphate in an Fe/rare earth element ratio of 8 or more.

The fifth aspect of the invention provides a resin composition for bonded magnets, containing, as the main ingredient, the highly weather-resistant magnet powder of one of the first to fourth inventions.

The sixth aspect of the invention provides a bonded magnet produced by forming the resin composition of the fifth invention for bonded magnets.

The seventh aspect of the invention provides a compacted magnet produced by compacting the highly weather-resistant magnet powder of one of the first to fourth inventions to an apparent density of 85% or more of the intrinsic density.

PREFERRED EMBODIMENTS OF THE INVENTION

The present invention is described more concretely.

1. Magnet Alloy Powder

The magnet alloy powder for the present invention is not limited, so long as it is an iron-based magnet alloy powder at least containing a rare-earth element. Some of the examples include rare-earth/iron/boron-based and rare-earth/iron/nitrogen-based magnet powders normally used for bonded magnets. Of these, the more preferable ones include Nd—Fe—B-based alloy powder produced by rapid quenching in a liquid, and Sm—Fe—N-based alloy powder. It is especially preferable to uniformly coat an Sm—Fe—N-based alloy powder with chemically reacted zinc film beforehand. This treatment reduces the soft magnetic phase and other defects on the particle surfaces to bring about favorable effects, e.g., still improved effect of the phosphoric acid treatment as the subsequent step, and resistance of the magnet product to weather and heat. An Nd—Fe—B-based alloy powder produced by rapid quenching in a liquid, taking a peculiar flaky shape, is preferably used after being crushed by jet or ball mill.

2. Highly Weather-resistant Magnet Powder

The highly weather-resistant iron-based magnet powder of the present invention contains a rare-earth element, wherein the particles of the magnet powder are uniformly coated with a phosphate film to a thickness of 5 to 100 nm on the average.

Coating of the conventional magnet powder involves treatment of the crushed powder with an agent, e.g., phosphate. However, the crushed magnetic particles agglomerate with each other by the magnetic force, which prevents the contact surfaces of the powder from being uniformly coated with the phosphate. When such a powder is kneaded together with a resin or the like to produce a bonded magnet, the agglomerated particles are partly broken by shear force during the kneading step, to expose uncoated, and hence active, particle surfaces. The bonded magnet produced by forming such a powder will be easily corroded in a humid atmosphere, to lose its magnetic properties. In particular, a magnet powder of nucleation-type mechanism for manifestation of coercive force, e.g., Sm—Fe—N-based alloy, will significantly lose its coercive force, when it has exposed uncoated particles, even a small amount. This type of problem is common to a magnet produced by compacting magnet powder.

On the other hand, the magnet powder of the present invention is stabilized by the phosphate film having a thickness of 5 to 100 nm on the average. Therefore, kneading the powder together with a resin to produce a bonded magnet should not evolve the new surfaces, even when the agglomerated particles are partly broken by shear force during the kneading step, with the result that the bonded magnet will have very high resistance to weather. In other words, it is essential for the finely crushed magnet powder itself of the present invention to be stabilized by the uniform phosphate film, in order to bring about the excellent magnetic characteristics.

The uniform coating for the present invention means that the magnet powder is coated with the phosphate film normally over 80% or more of the surfaces, preferably 85% or more, more preferably 90% or more.

Therefore, the method of the present invention for producing the highly weather-resistant magnet powder is not limited. For example, it may crush the iron-based alloy magnet powder containing a rare-earth element in an organic solvent in the presence of phosphoric acid. Phosphoric acid added to the alloy magnet powder being crushed by an attritor or the like stabilizes the particle surfaces, even when the new surfaces are evolved in the agglomerated particles during the crushing step, because the new surfaces will immediately react with phosphoric acid and are coated with the phosphate film. Even when the crushed magnet powder particles later agglomerate with each other by a magnetic force, the contact surfaces are already stabilized not to cause corrosion when the agglomerated particles are broken.

Thickness of the phosphate coating film needed to protect the magnet particle surfaces is normally 5 to 100 nm on the average. Resistance to weather may not be sufficiently secured at a thickness less than 5 nm. At more than 100 nm, on the other hand, the magnet powder may deteriorate in magnetic characteristics, and also in kneadability and moldability while it is formed into a bonded magnet.

It should be noted that, in an iron-based alloy magnet powder containing a rare-earth element, each of the component element may be converted into the phosphate when treated with phosphoric acid, and that the rare-earth element may be preferentially eluted out to form the phosphate, because it has much higher ionization tendency than the others. Little problem is anticipated also in this case with respect to resistance of the magnet powder to heat, because it can be sustained by the phosphate coating film. However, the coating film preferably contains more iron phosphate, viewed from resistance of the powder to weather, because iron phosphate has higher resistance to weather than a phosphate of rare-earth element, and the Fe concentration increases on the magnet particle surfaces, under the conditions in which the rare-earth element is eluted out preferentially, to change magnetic characteristics of the powder.

Therefore, an elemental ratio of Fe/rare-earth element in the phosphate is adjusted at 8 or more, in consideration of, e.g., phosphoric acid addition rate and mixing time. The coating film may deteriorate in stability at the ratio less than 8.

Phosphoric acid for forming the phosphate coating film is not limited. Commercially available, normal phosphoric acid, e.g., 85% aqueous solution of phosphoric acid, may be used.

The method of adding phosphoric acid is not limited. For example, it may be added to the organic solvent in which the alloy magnet powder is crushed by an attritor. It may be added all at once before the crushing is started or little by little during the crushing process, in such a way to have a given content in the final stage. The organic solvent useful for the present invention is not limited. Some of the solvents normally used include alcohols, e.g., ethanol and isopropyl alcohol, ketones, lower hydrocarbons, aromatics and a mixture thereof.

The adequate content of phosphoric acid depends on, e.g., particle size and surface area of the crushed magnet powder, and is not set sweepingly. Normally, however, it is added at 0.1 mols or more but less than 2 mols per kg of the alloy magnet powder, preferably 0.15 to 1.5 mols/kg, more preferably 0.2 to 0.4 mols/kg. At less than 0.1 mols/kg, treatment of the magnet powder surfaces is insufficient to have improved resistance to weather. Moreover, the powder is oxidized and heated, when dried in air, to have rapidly deteriorated magnetic characteristics. At 2 mols/kg or more, on the other hand, phosphoric acid reacts rapidly with the magnet powder, to dissolve it in the solution.

It is preferable to thermally treat the phosphoric acid-treated magnet powder at 100° C. or higher but lower than 400° C. in an inert or vacuum atmosphere. When treated at lower than 100° C., the magnet powder is dried insufficiently and formation of the stable surface coating film will be retarded. Treatment at 400° C. or higher, on the other hand, causes a problem of deteriorated coercive force of the magnet powder, conceivably because it is damaged under the thermal condition.

The conventional method needs slow oxidation of the magnet powder by carefully introducing a small quantity of oxygen in the inert atmosphere, to prevent its oxidation. This invariably extends the drying time, possibly pushing up the production cost. For the temporal changes in magnetic characteristics of the treated magnet powder, it keeps a relatively high coercive force at 80° C. in a dry atmosphere, but loses around 60% of the initial coercive force, when left at 80° C. and RH 90% for 24 hours.

The drying time can be reduced in the method of the present invention astonishingly without needing any special condition except that the alloy magnet powder is dried in an inert or vacuum atmosphere by merely adding an adequate quantity of phosphoric acid during the powder crushing process, conceivably because phosphoric acid triggers a mechanochemical mechanism to form a coating film over the magnet powder surfaces.

The treated magnet powder remains essentially unchanged in coercive force even when exposed to an atmosphere of 80 ° C. and RH 90% for 24 hours, showing greatly improved resistance to weather. The excellent function/effect is just unexpected, although the mechanism involved therein has not been understood yet.

3. Resin Composition for Bonded Magnets, and Bonded Magnet

The methods of producing the resin composition for bonded magnets and bonded magnet using the highly weather-resistant magnet powder of the present invention are not limited. For example, the following known thermoplastic resins and additives can be used for producing them.

(Thermoplastic Resins)

The thermoplastic resin serves as the binder for the magnet powder. It is not limited, and a known one can be used.

The concrete examples of the thermoplastic resins include polyamide resins, e.g., 6-nylon, 6,6-nylon, 11-nylon, 12-nylon, 6,12-nylon, aromatic nylon and modified nylon which is one of the above compounds partly modified; and straight-chain polyphenylene sulfide, crosslinked polyphenylene sulfide, semi-crosslinked polyphenylene sulfide, low-density polyethylene, linear, low-density polyethylene, high-density polyethylene, ultrahigh-molecular-weight polyethylene, polypropylene, ethylene/vinyl acetate copolymer, ethylene/ethyl acrylate copolymer, ionomer, polymethyl pentene, polystyrene, acrylonitrile/butadiene/styrene copolymer, acrylonitrile/styrene copolymer, polyvinyl chloride, polyvinylidene chloride, polyvinyl acetate, polyvinyl alcohol, polyvinyl butyral, polyvinyl formal, methacryl, polyvinylidene fluoride, polyethylene chloride trifluoride, ethylene tetrafluoride/propylene hexafluoride copolymer, ethylene/ethylene tetrafluoride copolymer, ethylene tetrafluoride/perfluoroalkylvinyl ether copolymer, polytetrafluoroethylene, polycarbonate, polyacetal, polyethylene terephthalate, polybutylene terephthalate, polyphenylene oxide, polyallyl ether allyl sulfone, polyether sulfone, polyetheretherketone, polyallylate, aromatic polyester, cellulose acetate resins, an elastomer of one of the above resins. Each of the above resins may be a homopolymer, or random, block or graft copolymer with another type of monomer. Moreover, it may be modified with another compound at the terminal.

Melt viscosity and molecular weight of the above thermoplastic resin is preferably on the lower side in an acceptable range to secure required mechanical strength of the bonded magnet for which it is used. The thermoplastic resin may be in any form, e.g., powder, bead or pellet, of which powder is more preferable for producing a uniform mixture of the magnet powder.

The thermoplastic resin is incorporated normally at 5 to 100 parts by weight per 100 parts by weight of the magnet powder, preferably 5 to 50 parts by weight. At less than 5 parts by weight, the composition may have an excessive kneading resistance (torque) or lose fluidity, making it difficult to form the composition into a magnet. At more than 100 parts by weight, on the other hand, the composition may not have desired magnetic characteristics.

(Other Additives)

The composition for bonded magnets which use the highly weather-resistant magnet powder of the present invention may be incorporated with one or more types of additives, e.g., lubricant for plastic forming and stabilizer, within limits not harmful to the object of the present invention.

The lubricants useful for the present invention include wax, e.g., paraffin, liquid paraffin, polyethylene, polypropylene, ester, carnauba and micro wax; fatty acids, e.g., stearic, 1,2-oxystearic, lauric, palmitic and oleic acid; fatty acid salts (metal soaps), e.g., calcium stearate, barium stearate, magnesium stearate, lithium stearate, zinc stearate, aluminum stearate, calcium laurate, zinc linoleate, calcium ricinoleate and zinc 2-ethylhexonate; fatty acid amides, e.g., stearic acid amide, oleic acid amide, erucic acid arnide, behenic acid amide, palmitic acid amide, lauric acid amide, hydroxystearic acid amide, methylenebisstearic acid amide, ethylenebisstearic acid amide, ethylenebislauric acid amide, distearyladipic acid amide, ethylenebisoleic acid amide, dioleiladipic acid amide and N-stearylstearic acid amide; fatty acid esters, e.g., butyl stearate; alcohols, e.g., ethylene glycol and stearyl alcohol; polyethers, e.g., polyethylene glycol, polypropylene glycol, polytetramethylene glycol and modified compounds thereof; polysiloxanes, e.g., dimethyl polysiloxane and silicon grease; fluorine compounds, e.g., fluorine-based oil, fluorine-based grease and fluorine-containing resin powder; and powders of inorganic compounds, e.g., silicon nitride, silicon carbide, magnesium oxide, alumina, silicon dioxide and molybdenum disulfide. These lubricants may be used either individually or in combination. The lubricant is incorporated normally at 0.01 to 20 parts by weight per 100 parts by weight of the magnet powder, preferably 0.1 to 10 parts by weight.

The stabilizers useful for the present invention include hindered amine-based ones, e.g., bis(2,2,6,6-tetramethyl-4-piperidyl)sebacate, bis(1,2,2,6,6-pentamethyl-4-piperidyl) sebacate, 1-[2-{3-(3,5-di-tert.butyl-4-hydroxyphenyl) propionyloxy}ethyl]-4-{3-(3,5-di-tert.butyl-4-hydroxyphenyl)propionyloxy}-2,2,6,6-tetramethyl piperidine, 8-benzyl-7,7,9,9-tetramethyl-3-octyl-1,2,3-triazaspiro[4,5]undecane-2,4-dione, 4-benzoyloxy-2,2,6,6-tetramethyl piperidine, a polycondensate of dimethyl succinate-1-(2-hydroxyethyl)-4-hydroxy-2,2,6,6-tetramethyl piperidine, poly[[6-(1,1,3,3-tetramethylbutyl) imino-1,3,5-triazine-2,4-diyl][(2,2,6,6-tetramethyl-4-piperidyl)imino]hexamethylene[(2,2,6,6-tetramethyl-4-piperidyl)imino]], and 2-(3,5-di-tert.butyl-4-hydroxybenzyl)2-n-butyl malonate bis(1,2,2,6,6-pentamethyl-4-piperidyl); and antioxidants, e.g., phenol-, phosphite- and thioether-based ones. These stabilizers may be also used either individually or in combination. The stabilizer is incorporated normally at 0.01 to 5 parts by weight per 100 parts by weight of the magnet powder, preferably 0.05 to 3 parts by weight.

The method of mixing these components is not limited, and the mixing may be effected by a mixer, e.g., ribbon blender, tumbler, Nauta mixer, Henschel mixer or super-mixer; or kneading machine, e.g., Banbury mixer, kneader, roll, kneader-ruder, or mono axial or biaxial extruder. The composition for bonded magnets thus produced may be in the form of powder, bead, pellet or a combination thereof, of which pellet form is preferable for ease of handling.

Next, the composition of bonded magnets is heated and molten at a melting point of the thermoplastic resin component, and then formed into a magnet of desired shape. It may be formed by a known plastic molding method, e.g., injection molding, extrusion, injection compression molding, injection pressing, or transfer molding, of which injection molding, extrusion, injection compression molding and injection pressing are preferable.

4. Compacted Magnet

The compacted magnet produced by compacting the above-described highly weather-resistant magnet powder to an apparent density of 85% or more of the intrinsic density, preferably 90% or more, more preferably 95% or more. The method of producing the compacted magnet is not limited, so long as it can apply a sufficient compression force to the magnet powder to an apparent density of 85% or more of the intrinsic density. It is essential for the compacted magnet of the present invention to have an apparent density of 85% or more of the intrinsic density; otherwise it will have insufficient magnetic characteristics, and a number of open pores to provide passages for oxygen and moisture, which cause deterioration of the magnet powder, resulting in deteriorated resistance to weather. The magnet powder of the present invention, inherently having high resistance to weather, will give the compacted magnet of still higher resistance to weather, when it is compacted to remove the open pores therein.

When an Sm—Fe—N-based magnet powder is used to produce a compacted magnet, the magnet powder of the present invention gives the magnet of improved magnetic characteristics and coercive force, in addition to resistance to weather. The methods of treating the Sm—Fe—N-based magnet powder to produce the compacted magnet include hot isostatic pressing (HIP) (Powder and Powder Metallurgy, No. 47, 2000, pp. 801), impact compression (Japanese Patent Laid-Open No. 77027/1994) and conductive powder rolling (Japanese Patent Laid-Open No. 294415/2000). A compacted magnet of the conventional Sm—Fe—N-based magnet powder will have an insufficient coercive force for practical purposes, conceivably resulting from decomposition or denitrogenation of the Sm—Fe—N-based compound, or increased magnetic interactions caused by the metallic bond between the magnet powder particles.

The magnet powder of the present invention controls not only decomposition and denitrogenation of the Sm—Fe—N-based compound but also deterioration of its coercive force, because of the presence of uniform non-magnetic, phosphate coating film between the particles.

PREFERRED ENBODIMENTS

The present invention is described more concretely by EXAMPLES and COMPARATIVE EXAMPLES, which by no means limit the present invention. The details of the components and evaluation method used in EXAMPLES and COMPARATIVE EXAMPLES are described.

(1) Components

Magnet Alloy Powder

Sm—Fe—N-based alloy magnet powder (Sumitomo Metal Mining), average particle size: 30 μm Phosphoric acid 85% Aqueous solution of orthophosphoric acid (phosphoric acid, Kanto Kagaku)

(2) Evaluation Methods

① Coating Film Thickness

The magnet powder sample was monitored for the P and O spectra by an XPS, while it was Ar-sputtered. The interface between the coating film and base was defined as the position at which the maximum intensity of the P profile of the coating film was halved, and time L (seconds) for sputtering from the surface to the interfacial position was measured. The time L was multiplied by sputtering rate 5 nm/minute with the standard sample of SiO2, to determine thickness of the film as SiO2.

② Ratio of Fe/rare-earth Element

The magnet powder sample was analyzed for the Fe and Sm spectra by an XPS, while it was Ar-sputtered, to determine the area intensity of each element, which was multiplied with the sensitivity coefficient of the analyzer (VG Scientific, ESCALAB220i-XL) to determine the ratio.

③ Coercive Force

The magnet sample prepared was left in an atmosphere of 80° C. and RH 95% for 24 hours, and measured for its coercive force at normal temperature by a Cioffi type recording fluxmeter.

EXAMPLES 1 TO 5, AND COMPARATIVE EXAMPLES 1 TO 4

1 kg of Sm—Fe—N magnet powder was crushed in 1.5 kg of isopropanol by an attritor, whose inside was purged with nitrogen, at 200 rpm for 2 hours, to prepare the magnet powder having an average particle size of 3 μm. It was incorporated with a given quantity of 85% orthophosphoric acid during or after the crushing step. The magnet powder thus prepared was dried at 120° C. under a vacuum for 4 hours, and analyzed for its coating film thickness and Fe/rare-earth element ratio by the above-described methods. The results are given in Table 1.

The magnet powder thus prepared was incorporated with 12 nylon (powder volumetric ratio: 54%), kneaded by a laboplastomill, and injection-molded to prepare the bonded magnet. It was analyzed for its coercive force by the above-described method. The results are given in Table 1.

EXAMPLE 6

1 kg of Sm—Fe—N magnet powder and 30 g of zinc powder (3% by weight on the alloy magnet powder) were crushed in 1.5 kg of isopropanol by an attritor, whose inside was purged with nitrogen, at 200 rpm for 1 hour, heat-treated at 430° C. for 10 hours in a flow of Ar gas at 1 L/minute, and then withdrawn out of the attritor after it was cooled to room temperature. The powder particles were coated with zinc and agglomerated. The agglomerated particles were then broken in an isopropanol solution incorporated with a 85% orthophosphoric acid solution for 20 minutes in an attritor, wherein the aqueous orthophosphoric acid solution was added at 0.30 mols of phosphoric acid per 1 kg of the coated, agglomerated particles.

The magnet powder thus prepared was dried at 120° C. under a vacuum for 4 hours, and analyzed for its coating film thickness and Fe/rare-earth element ratio by the above-described methods. The results are given in Table 1.

The magnet powder thus prepared was incorporated with 12 nylon (powder volumetric ratio: 54%), kneaded by a laboplastomill, and injection-molded to prepare the bonded magnet. It was analyzed for its coercive force by the above-described method. The results are given in Table 1.

EXAMPLE 7

The surface coverage by the phosphate film was measured for the magnet powders prepared in EXAMPLE 4 and COMPARATIVE EXAMPLE 3, which were incorporated with the same quantity of phosphoric acid and had almost the same coating film thickness and Fe/rare-earth element ratio. For measurement of the coverage, each magnet sample was immersed in an organic solvent to recover the magnet powder, and the particle cross-sections were observed by a transmission electron microscope, to analyze phosphorus on the magnet powder particle surfaces by an energy dispersion type X-ray detector at a total of arbitrarily selected 20 points in the vicinity of the particle surfaces. Phosphorus was observed at all of the points on the alloy magnet powder particles prepared in EXAMPLE 4, wherein phosphoric acid was added during the crushing step, whereas it was observed only at 15 points (75%) on the particles prepared in COMPARATIVE EXAMPLE 3, wherein phosphoric acid was added after the crushing step. Phosphorus was analyzed at arbitrarily selected 5 points for each of the magnet powders prepared in EXAMPLES 1 to 3 and 5 to 6 in the same manner. Phosphorus was observed at all of the points. Thickness of the phosphate coating film was directly measured, and found to be almost the same as the overall average thickness determined by XPS for each powder.

EXAMPLE 8

The magnet powders prepared in EXAMPLES 5 and 6 were analyzed for their resistance to heat by measuring their coercive force after they were heat-treated at 290° C. under a vacuum for 1 hour. The former had a coercive force of 8.50 kOe whereas the latter 11.75 kOe. Thus, the zinc-coated powder prepared in EXAMPLE 6 was more resistant to heat than the powder coated only with the phosphate film, prepared in EXAMPLE 5.

TABLE

| | Addition rate of the phosphoric acid (mol/kg) | Phosphoric acid mixing time (minutes) | Coating film thickness (nm) | Fe/rare-earth element ratio | Coercive force (kOe) Initial | After the sample was left for 24 hours |
|---|---|---|---|---|---|---|
| EXAMPLE 1 | 0.16 | 30 (During crushing) | 12 | 9.5 | 0.6 | 10.55 |
| EXAMPLE 2 | 0.22 | 40 (During crushing) | 22 | 9.0 | 0.7 | 10.70 |
| EXAMPLE 3 | 0.30 | 120 (During crushing) | 69 | 11.2 | 0.5 | 10.65 |
| EXAMPLE 4 | 0.22 | 15 (During crushing) | 18 | 8.2 | 0.8 | 10.45 |
| EXAMPLE 5 | 0.30 | 10 (During crushing) | 32 | 8.6 | 0.6 | 10.40 |
| EXAMPLE 6 | 0.30 | 20 (During crushing) | 38 | 8.5 | 2.8 | 12.65 |
| COMPARATIVE EXAMPLE 1 | 0.08 | 30 (During crushing) | 3 | Immeasurable | 0.2 | 3.80 |
| COMPARATIVE EXAMPLE 2 | 0.22 | 2 (After crushing) | 1.5 | 6.2 | 0.4 | 4.25 |
| COMPARATIVE EXAMPLE 3 | 0.22 | 30 (After crushing) | 20 | 8.0 | 0.5 | 5.20 |
| COMPARATIVE EXAMPLE 4 | 2.3 | 60 (During crushing) | 130 | 8.5 | 7.8 | 6.85 |
| EXAMPLE 4 | | (During crushing) | | | | |

As shown in Table 1, each of the bonded magnets produced by forming the magnet powder of the present invention showed little deterioration of coercive force, even when left at 80° C. in a humid atmosphere of RH95%, because the magnet powder particle surfaces are uniformly protected by the phosphate coating film of adequate thickness, rich in iron phosphate. Thus, it has much improved resistance to weather in a practically important humid atmosphere. The magnet of the powder particles coated with zinc, prepared in EXAMPLE 6, showed higher coercive force and resistance to weather.

EXAMPLES 9 TO 14, AND COMPARATIVE EXAMPLES 5 TO 9

In each of EXAMPLES 9 to 14, and COMPARATIVE EXAMPLES 5 to 9, 10 g of the magnet powder put in an aluminum capsule in a nitrogen atmosphere, and monoaxially pressed at 50 MPa in an oriented magnetic field of 1600 kA/m, wherein the powders prepared in EXAMPLES 1 to 6 were used for respective EXAMPLES 9 to 14, and those prepared in COMPARATIVE EXAMPLES 1 to 4 for respective COMPARATIVE EXAMPLES 5 to 9. Each compact thus prepared was then treated by hot isostatic pressing (HIP) under the conditions of 450° C., 200 MPa and 30 minutes, while it was kept in the capsule, wherein a nitrogen gas was used as the pressure medium. They were analyzed for their coercive force. The results are given in Table 2, where apparent density is relative to the intrinsic density of 7.67 g/cc. For COMPARATIVE EXAMPLE 9, the magnet powder prepared in EXAMPLE 6 was used and HIP-treated at 150 MPa.

TABLE 2

| | Apparent density (%) | Coercive force (kOe) Initial | After the sample was left for 24 hours |
|---|---|---|---|
| EXAMPLE 9 | 97 | 10.20 | 10.10 |
| EXAMPLE 10 | 96 | 10.25 | 10.15 |
| EXAMPLE 11 | 95 | 10.40 | 10.45 |
| EXAMPLE 12 | 97 | 10.55 | 10.40 |
| EXAMPLE 13 | 95 | 10.35 | 10.15 |
| EXAMPLE 14 | 97 | 13.10 | 13.05 |
| COMPARATIVE EXAMPLE 5 | 97 | 9.85 | 6.25 |
| COMPARATIVE EXAMPLE 6 | 97 | 9.55 | 6.00 |
| COMPARATIVE EXAMPLE 7 | 95 | 10.10 | 6.80 |
| COMPARATIVE EXAMPLE 8 | 94 | 7.50 | 7.35 |
| COMPARATIVE EXAMPLE 9 | 83 | 10.50 | 9.75 |

As shown in Table 2, each of the compacted magnet prepared by compacting the magnet powder of the present invention to an apparent density of 85% or more had an initial coercive force exceeding 10 kOe, because the magnet powder particles were uniformly protected by the phosphate coating film of adequate thickness, rich in iron phosphate. Each magnet lost little of the initial coercive force even when left at 80° C. and RH 95 for 24 hours, indicating that it had greatly improved resistance to heat in a practically important humid atmosphere. The compacted magnet prepared in EXAMPLE 14, wherein the Sm—Fe—N-based alloy powder reaction-coated with zinc was compacted, showed still higher coercive force and resistance to weather. The magnet prepared in COMPARATIVE EXAMPLE 9, having a relative density of 85%, was less resistant to weather than the one prepared in EXAMPLE 9.

INDUSTRIAL APPLICABILITY

As described above, the magnet powder of the present invention shows much higher resistance to weather than the conventional one, because the powder particles are uniformly protected by the phosphate coating film of adequate thickness, rich in iron phosphate. The agglomerates of the dried magnet particles can be broken without generating heat, which allows the powder to be handled more easily for production a magnet, and prevents heat-caused deterioration of the magnetic characteristics. The magnet powder of the present invention is of great industrial importance, because it can give highly weather-resistant bonded and compacted magnets.

We claim:

1. A highly weather-resistant magnet powder comprising iron and a rare-earth element, wherein said magnet powder is an alloy powder selected from the group consisting of Nd—Fe—B and Sm—Fe—N;

wherein particles of said magnet powder comprise uniform coating with a phosphate film to a thickness of 5 to 100 nm on the average; and wherein said particles of said magnet powder are prepared by crushing an alloy magnet powder in an organic solvent having added thereto phosphoric acid.

2. The highly weather-resistant magnet powder according to claim 1, wherein the particles of said Sm—Fe—N alloy powder are uniformly coated with a zinc film before being coated with said phosphate film.

3. The highly weather-resistant magnet powder according to claim 1, wherein said phosphate coating film is a composite composed of iron phosphate and another phosphate and comprises iron phosphate in an Fe/rare earth element atomic ratio of 8 or more.

4. The highly weather-resistant iron-based magnet powder according to claim 3, wherein the magnet powder is formed as a compacted magnet by compacting the highly weather-resistant magnet powder to an apparent density of 85% or more of the intrinsic density.

5. The highly weather-resistant iron-based magnet powder according to claim 1, wherein the magnet powder is formed as a compacted magnet by compacting the highly weather-resistant magnet powder to an apparent density of 85% or more of the intrinsic density.

6. The highly weather-resistant magnet powder according to claim 1, wherein said magnet powder is coated with the phosphate film over 80% or more of the surfaces of the magnet powder.

7. A resin composition for bonded magnets, comprising, as the ingredient present in the largest amount by weight, a highly weather-resistant magnet powder comprising a rare-earth element, wherein particles of said magnet powder comprise uniform coating with a phosphate film to a thickness of 5 to 100 nm on the average; and wherein said particles of said magnet powder are prepared by crushing an alloy magnet powder in an organic solvent having added thereto phosphoric acid.

8. The resin composition for bonded magnets according to claim 7, wherein said magnet powder comprising a rare earth element is an alloy powder selected from the group consisting of Nd—Fe—B and Sm—Fe—N powder.

9. The resin composition for bonded magnets according to claim 8, wherein the particles of said Sm—Fe—N alloy powder are uniformly coated with a zinc film before being coated with said phosphate film.

10. The resin composition for bonded magnets according to claim 7, wherein said phosphate coating film is a composite composed of iron phosphate and another phosphate and comprises iron phosphate in an Fe/rare earth element atomic ratio of 8 or more.

11. The resin composition for bonded magnets according to claim 10, wherein the resin composition is formed as a bonded magnet.

12. The resin composition for bonded magnets according to claim 7, wherein the resin composition is formed as a bonded magnet.

* * * * *